2,930,736

STABILIZED TRYPSIN COMPOSITIONS CONTAINING PARTIALLY HYDROLYZED GELATIN AND METHOD OF MAKING

Miller J. Sullivan, Ambler, and Gustav J. Martin, Philadelphia, Pa., assignors to The National Drug Company, Philadelphia, Pa., a corporation of Delaware No Drawing. Application January 7, 1957
Serial No. 632,677

6 Claims. (Cl. 167—73)

This invention relates to and has for its object the provision of stable trypsin in gelatin compositions and methods for their preparation.

Comparatively recently, trypsin has been recommended and used in cases of acute thrombophlebitis and phlebothrombosis. Difficulties, however, have arisen where such compositions are used for parenteral administration. Thus, trypsin in aqueous solution has been found to be relatively unstable and must, therefore, be freshly prepared immediately prior to use. In addition, it has been found in many instances that intramuscular administration of trypsin in aqueous solution, aqueous isotonic solution or oleaginous suspension often results in considerable pain at the injection point. It has now been found that trypsin compositions containing aqueous partially hydrolyzed gelatin are far more stable and will, in addition, reduce to a large extent the pain previously noted on injection. While applicants do not wish to be bound by any theory, it may be that the reduction in pain is due to the fact that the trypsin digests partially hydrolyzed gelatin in preference to the tissues injured during injection and thus reduces the pain factor considerably. Furthermore, it may be that the presence of polypeptides results in a shift of the equilibrium between active and inactive trypsin and, as a result, causes improved stability. The latter is highly important since it is well known that the activity of trypsin is rapidly reduced in aqueous media.

The term "proteolytic enzyme," as used herein, is meant to include trypsin, per se, as well as the related proteolytic enzymes, such as chymotrypsin, pepsin, bromelin, papain, etc., and also streptokinase. Preferred for use as the proteolytic enzyme is trypsin or chymotrypsin; especially preferred is trypsin.

The partially hydrolyzed gelatin used in the compositions of the invention should be sterile, pyrogen-free and non-antigenic. Such partially hydrolyzed gelatin is obtained from standard and well known gelatin (e.g. Knox 250A Pharmagel A, etc.) which is normally prepared from refined beef bone or pork skin collagen and marketed as a dry solid. For the invention, the gelatin may be used in aqueous solution and must be partially hydrolyzed (e.g. by heating in dilute acid). Thus, an aqueous solution of the partially hydrolyzed gelatin (polypeptide hydrolysate) may be prepared by dissolving 22% by weight of gelatin (e.g. Knox 250A Pharmagel A, etc.) in warm 0.001 N hydrochloric acid solution containing 0.01% Propyl Paraben and 0.09% Methyl Paraben (weight by volume), heating the mixture in an autoclave for two to five hours at 100° C. or for one to three hours at 120° C., then filtering and diluting to the desired concentration with distilled water containing the Parabens in the concentrations given above. The pH is adjusted to about 3.2 to about 4.8 (preferably about 3.6) with additional hydrochloric acid. A 5% aqueous solution is generally applicable for use. However, more or less concentrated solutions may be used. The gelatin solution may alternatively be prepared by dissolving 10% (by weight) of gelatin in warm 0.01 N hydrochloric acid solution containing 0.01% Propyl Paraben and 0.09% Methyl Paraben (weight by volume). The resulting solution is heated to 80–100° C. and maintained at that temperature for 1 hour; it is then filtered and the pH of the filtrate is adjusted to pH about 3.2 to about 4.8 with hydrochloric acid, then diluted with water containing 0.01% Propyl and 0.09% Methyl Paraben to obtain a 5% solution.

In place of the hydrochloric acid used above in preparing the partially hydrolyzed gelatin solutions, one may use other suitable, non-reactive strong acids, such as phosphoric, lactic etc. It is important, however, that the pH of the final partially hydrolyzed gelatin solution be maintained at pH about 3.2 to about 4.8, preferably about 3.6. The Parabens are employed as preservatives and one may utilize other Parabens in place of the Methyl and Propyl Paraben or other preservatives, such as phenol, acresol, p-chlorocresol, thimerosal, etc.

The injectable trypsin compositions of the invention may be prepared in one form by dissolving the crystalline trypsin in distilled water (or preferably in a small amount of 0.01 N hydrochloric acid), then incorporating it into the aqueous, sterile, pyrogen-free non-antigenic gelatin solution, prepared for example, as described above. Lyophylized trypsin (prepared by dissolving the trypsin in water or .01 N hydrochloric acid, freezing, then freeze drying) may easily be dissolved directly into 5% partially hydrolyzed aqueous sterile, pyrogen-free, non-antigenic gelatin solution to form a product suitable for injection. The resulting composition is adjusted to a pH about 4 by adding more acid or alkali and may be buffered to maintain this pH by the addition of acid or alkali. Hydrochloric acid or sodium hydroxide is normally used for pH adjustment. However, other acids such as phosphoric, lactic, etc., and other alkalis such as potassium hydroxide may be used. The composition is maintained at an acid pH in the range of about 3.2 to about 4.8, preferably 3.6. Preservatives, such as Propyl Parasept (about 0.01 to 0.02% by weight), Methyl Parasept (about 0.09 to 0.18% by weight), etc., may also be added.

In another aspect of the invention, one may prepare the trypsin and partially hydrolyzed gelatin menstruum separately and combine the two immediately prior to use. In this aspect of the invention, the trypsin may be used as such. However, one preferably adds sufficient non-reactive, strong acid to the trypsin (e.g. 0.01 N hydrochloric acid) to form a solution having a pH about 2–3, then freeze-dries the resulting solution to obtain a product which is easily soluble and ready for admixture with the partially hydrolyzed gelatin menstruum. The partially hydrolyzed gelatin menstruum is prepared in the manner described above (i.e. by dissolving the partially hydrolyzed gelatin (polypeptide hydrolyzate) in dilute acid, adding preservatives, heating, filtering, diluting then adjusting the pH to about 3.2 to about 4.8).

In an additional aspect of the invention, one may prepare a lyophylized combination of trypsin and partially hydrolyzed gelatin for combination with an aqueous menstruum immediately prior to use. This may be done by freeze-drying a solution of trypsin in partially hydrolyzed gelatin to obtain a mixture readily soluble in the aqueous menstruum. The aqueous menstruum may contain preservatives (e.g. 0.1% Parabens) or acid (e.g. hydrochloric acid) or it may be isotonic saline. At any rate, it is important that the final product formed by combining the trypsin partially hydrolyzed gelatin component with the aqueous menstruum have a pH about 3.2 to about 4.8 (preferably 3.6) prior to use.

Administration by injection is effected preferably intramuscularly using 2½–5 mg. of trypsin or other proteolytic enzyme (½ or 1 ml. of product having a concentration of 5 mg. trypsin/ml.) one to four or more times daily, as required.

Following are more specific examples illustrative but not limitative of the invention. Unless otherwise indicated, all parts are by weight:

EXAMPLE I

About 5 mg./ml. crystalline trypsin is added, with stirring, to a 5% aqueous solution of non-antigenic, pyrogen-free, partially hydrolyzed gelatin (Knox 250A) prepared by heating the gelatin in 0.001 N hydrochloric acid at 100° C. for three hours at 100° C. About 0.09% Methyl Parasept and 0.01% Propyl Parasept is added to the resulting mixture and, after uniformity is attained by stirring, the pH is adjusted to 3.6 by adding the required amount of hydrochloric acid or sodium hydroxide. A pH of 3.2, 3.5, 4.5, etc., may, of course, be obtained by varying the amount of acid or alkali and the concentration of trypsin may be altered by varying the amount of enzyme added to the gelatin solution. The product, adjusted to pH about 3.2 to about 4.8 may be used as such for injection by standard procedure.

EXAMPLE II

*First vial—Gelatin menstruum*

| | | |
|---|---|---|
| Gelatin Knox 250A | grams | 3000 |
| Propyl Paraben | do | 6.0 |
| Methyl Paraben | do | 54.0 |
| Concentrated hydrochloric acid (36.5 to 38%) | ml | 90 |
| Dist. water, q.s | liters | 60 |

55 liters of water are brought to boiling and Propyl Paraben and Methyl Paraben are added. The hydrochloric acid is then added to the aqueous solution and mixing is effected to attain uniformity. The gelatin is then added and the resulting mixture is heated to 80–100° C. and maintained at that temperature for one hour.

The pH is now adjusted to 3.5 with additional hydrochloric acid and the solution is made to volume with distilled water.

30 grams of sterile, washed filter aid (Hi-Flo) is added and the solution is filtered through No. 52 Whatman paper.

It is then filled into ampule-vials in 5.8 ml. portions and sterilized for ½ hour at 100° C.

*Second vial—Lyophylized trypsin*

| | | |
|---|---|---|
| Crystalline trypsin | gms | 125 |
| 0.01 N hydrochloric acid, q.s | ml | 5000 |

The trypsin is dissolved in the hydrochloric acid and filtered through No. 52 Whatman paper. It is then filtered through a Selas O2 filter into a sterile container. Under aseptic conditions 1.0 ml. is filled into each vial and lyophylization follows.

5 ml. partially hydrolyzed gelatin menstruum is mixed with 25 mg. lyophylized trypsin for injection use.

EXAMPLE III

*First vial—Aqueous menstruum*

| | | |
|---|---|---|
| Propyl Paraben | gm | 6.0 |
| Methyl Paraben | gm | 54.0 |
| Distilled water, q.s | liters | 60 |

The Parabens are dissolved in the distilled water and the resulting solution is filtered through a medium sinter, filled into ampule-vials, each containing 5.8 ml. of solution and sterilized for 20 minutes at 120° C.

*Second vial—Trypsin-gelatin, lyophylized*

A partially hydrolyzed gelatin solution is prepared as described in Example II except that the concentration of gelatin is increased to 25%.

A solution of trypsin is prepared as described in Example II and is filtered through a bacterial filter (Selas O2) into a sterile container.

Under sterile conditions 5 liters of the sterile partially hydrolyzed gelatin solution described above is added to the trypsin solution and the pH is adjusted to 3.6.

2.0 ml. of the resulting solution containing 25 mg. trypsin and 0.5 g. partially hydrolyzed gelatin is filled into ampule vials and the contents are lyophylized in the usual way.

5 ml. aqueous menstruum is mixed with lyophylized trypsin partially hydrolyzed gelatin for injection use. The contents of an entire vial of lyophylized trypsin-gelatin is used for this purpose.

The products of the invention may be used especially for the alleviation of inflammatory and edematous manifestations, especially thrombophlebitis and phlebothrombosis. They may also be used in the treatment of other inflammatory diseases. Thus, they have been found useful in cases of iritis and other inflammatory eye conditions, diabetic and other leg ulcers, etc. When used intramuscularly, deep injection is preferred. The syringe used in injection is one preferably utilizing a #20 needle; injection is normally effected slowly into the gluteal muscle. The compositions may also be used in the same manner for thinning mucous secretions in the upper respiratory tract, as those found in bronchial asthma.

Test data have been obtained using a solution of 3 mg./ml. crystalline trypsin in 5% partially hydrolyzed gelatin. The solution, having a pH of 4.1, was tested by the standard hemoglobin digestion procedure (essentially that of Northrop, Kunitz and Herriot, "Crystalline Enzymes," Columbia University Press, 1948, page 107); and the test results showed that after two weeks of room temperature, no change in tryptic activity resulted. Tests were also made (using the above-mentioned solution) by a method essentially that of Fabinyi-Szebehelz, Brit. J. Pharmacol., 8, page 30, 1953, and the data obtained showed that the activity of the trypsin in partially hydrolyzed gelatin was comparable to that of trypsin in oil (Parenzyme).

Obviously many modifications and variations of the present invention are possible in the light of the above teachings. It is, therefore, to be understood that within the scope of the appended claims the invention may be practiced otherwise than as specifically described.

This application is a continuation in part of our co-pending application S.N. 560,862, filed January 23, 1956, now abandoned.

We claim:

1. A composition essentially comprising an aqueous solution of trypsin and preformed sterile, pyrogen-free, non-antigenic gelatin, the latter partially hydrolyzed by heating in a dilute acid for 2–5 hours at 100° C., said composition having a pH of about 3.2–4.8.

2. Composition of claim 1 containing a preservative.

3. A composition essentially comprising an aqueous solution of trypsin and a preformed pyrogen-free, sterile, non-antigenic gelatin, the latter being partially hydrolyzed by heating for 1–3 hours at about 120° C. in a dilute acid and its pH then adjusted to about 3.2–4.8.

4. A composition comprising an aqueous solution of (1) a proteolytic enzyme selected from the group consisting of trypsin, chymotrypsin, bromelin and papain, and (2) a pre-formed sterile, pyrogen-free, non-antigenic gelatin, the latter having been partially hydrolyzed by heating in a dilute acid for 1–5 hours at 100°–120° C. followed by adjustment of its pH to about 3.2–4.8.

5. A method of stabilizing a trypsin composition against self-digestion comprising incorporating into the composition a preformed denatured gelatin which has been partially hydrolyzed by heating at 80°–120° C. for 1–5 hours in the presence of a dilute acid and adjusted to a pH of about 3.2–4.8.

6. A method for the production of proteolytic enzyme compositions which comprises forming an acid solution of trypsin, freeze-drying said acid solution, and adding the resulting product to a non-antigenic, pyrogen-free gelatin, the latter being partially hydrolyzed by heating for 1–5 hours at 80°–120° C. in the presence of a dilute acid and its pH adjusted to about 3.2–4.8.

References Cited in the file of this patent

UNITED STATES PATENTS

Chem. Abstracts, 32: 3776[4]; 31: 3083[4]; 38: 758[5]; 47: 10026[G]; 47: 1247[G]; 47: 2781[A].

Taylor et al.: J.A.M.A., 155: 4, May 22, 1954, pp. 347–351.

Hardy et al.: Surg., Gynecol. and Obstetrics, 100: 1, January 1955, pp. 91–96.

Innerfield et al.: J.A.M.A., 152: 7, June 13, 1953, pp. 597–605.

Spain et al.: J. Allergy, 10: 3, March 1939, pp. 209–214.

Myerson et al.: Am. J. Med. Sci., August 1942, pp. 254–258.

Loewe et al.: Am. J. Med. Sci., July 1944, pp. 54–63.